US007867538B2

(12) United States Patent
Binder et al.

(10) Patent No.: US 7,867,538 B2
(45) Date of Patent: Jan. 11, 2011

(54) PROCESSES OF IMPROVING THE QUALITY OF OIL AND PRODUCTS PRODUCED THEREFROM

(75) Inventors: Thomas P. Binder, Decatur, IL (US); Inmok Lee, Decatur, IL (US)

(73) Assignee: Archer Daniels Midland Company, Decatur, IL (US)

( * ) Notice: Subject to any disclaimer, the term of this patent is extended or adjusted under 35 U.S.C. 154(b) by 1045 days.

(21) Appl. No.: 11/609,104

(22) Filed: Dec. 11, 2006

(65) Prior Publication Data
US 2007/0141222 A1 Jun. 21, 2007

Related U.S. Application Data

(60) Provisional application No. 60/751,831, filed on Dec. 20, 2005.

(51) Int. Cl.
*A23D 9/02* (2006.01)
(52) U.S. Cl. .................. 426/423; 426/424; 426/422
(58) Field of Classification Search .............. 426/601, 426/423, 424
See application file for complete search history.

(56) References Cited

U.S. PATENT DOCUMENTS

| | | | |
|---|---|---|---|
| 2,605,225 A | 7/1952 | Armstrong | |
| 2,771,480 A | 11/1956 | Chasanov et al. | |
| 2,985,706 A | 5/1961 | Walsh et al. | |
| 4,103,034 A | 7/1978 | Ronai | |
| 4,153,738 A | 5/1979 | Ronai | |
| 4,915,876 A | 4/1990 | Lindsay | |
| 5,079,208 A | 1/1992 | Lammers et al. | |
| 5,348,755 A | 9/1994 | Roy | |
| 5,840,735 A | 11/1998 | Labrie et al. | |
| 6,156,548 A | 12/2000 | Christensen | |
| 7,311,826 B2 * | 12/2007 | Tubbs et al. | 210/198.2 |

FOREIGN PATENT DOCUMENTS

| | | | |
|---|---|---|---|
| EP | 0376406 A1 | | 7/1990 |
| EP | 1183323 A1 | | 11/2000 |
| JP | HEI 8-140689 | * | 6/1996 |
| WO | 0044862 A1 | | 8/2000 |
| WO | 03075671 A1 | | 9/2003 |
| WO | 2005018339 A2 | | 6/2005 |

OTHER PUBLICATIONS

Zammouri, A. et al. 2000. Ind. Eng. Chem.Res 39:1397.*
Swern, D. 1980. Bailey's Industrial Oil and Fat Products, vol. 1, 4$^{th}$ edition. John Wiley & Sons, New York. p. 352-362.*
F. Gunstone, Reactions associated with double bonds, in Fatty Acid and Lipid Chemistry, 1999, Aspen Publishers, Gaithersburg, MD USA.
E. Frankel, Lipid Oxidation, 1998, The Oily Press, Dundee, Scotland.
J. B. Rossell, Classical analysis of oils and fats, in Analysis of oils and fats, 1986, Elsevier Applied Science Publishers, London, England.
A. Altschul, Biological processes of the cottonseed, 1948, p. 157-212, Alton E. Bailey, Editor, Interscience publishers, New York, New York, USA.
C. Dickert, Ion Exchange, in Kirk-Othmer Encyclopedia of Chemical Technology, Fourth Edition (vol. 14), 1995, p. 737-741 John Wiley & Sons, New York, New York, USA.
N. Toru, The effect of lipid oxidation on the activity of interesterification of triglyceride by immobilized lipase, Dev. Food Eng., Proc. Int. Congr. Eng. Food, 6th 1994, Me.
American Oil Chemists' Society, Determination of Oxidative Stability Index American Oil Chemists' Society Official Method Cd12b-92, in Official Methods and Recommended Practi.
American Oil Chemists' Society, Determination of p-Anisidine value, American Oil Chemists' Society Official Method Cd 18-90, in Official Methods and Recommended Practices of t.
ADM Feed Ingredients, Liquid Lysine 50%2 2003, ADM Specialty Ingredients Europe BV, Koog aan de Zaan, The Netherlands.
ADM Feed Ingredients, L-Lysine Monohydrochloride 98.5% Feed Grade, 2003, ADM Specialty Ingredients Europe BV, Koog aan de Zaan, The Netherlands.
Patent Cooperation Treaty, International Search Report, Apr. 2005, pp. 1-14.

* cited by examiner

*Primary Examiner*—Carolyn A Paden
(74) *Attorney, Agent, or Firm*—Scott Bloomer

(57) ABSTRACT

Oil of improved quality is produced by treating the oil with an active substance capable of reducing the anisidine value of the oil. Food products comprising the oil of improved quality are also disclosed.

5 Claims, No Drawings

PROCESSES OF IMPROVING THE QUALITY OF OIL AND PRODUCTS PRODUCED THEREFROM

CROSS-REFERENCE TO RELATED APPLICATIONS

This application claims the benefit of U.S. Provisional Application No. 60/751,831, filed Dec. 20, 2005, the entirety of which is incorporated by this reference.

TECHNICAL FIELD

The present disclosure relates generally to lipids and methods of decreasing the content of oxidation products in edible oils and fats and the oils and fats resulting therefrom.

BACKGROUND

Triglyceride oils are predominantly liquid at room temperature, and are distinguished by their physical state from fats, which are solid or semi-solid at room temperature. The liquid character of most triglyceride oils is a consequence of their content of lipids comprising fatty acids with one or more double bonds. Double bonds are sensitive to reactions, such as oxidation. Thus, lipids, such as oils, fats, fatty acids, partial glycerides, esters, phospholipids, and other compounds that contain double bonds are susceptible to oxidation reactions.

Lipid oxidation is a reaction that may occur between unsaturated lipids and oxygen, and is accelerated by several factors (light, heat, metals, and other initiating compounds). The consequence of lipid oxidation is often the generation of undesired reaction products. Many reaction products give rise to undesirable odors or flavors in edible oils and fats, as well as products made therefrom. Because of the complexity of natural oils and the large number of possible reaction pathways for a given oxidation reaction, oxidation reactions are incompletely understood. However, some are known to proceed in a radical chain reaction cascade fashion comprising several steps. Natural oils differ in their composition, and thus in their oxidation pathways. Antioxidants are commonly added to lipids to delay the onset of oxidative deterioration. In addition, oils can be stored under an inert gas, such as nitrogen or a noble gas, to minimize oxidation. Sometimes, inert gases are bubbled through oils to displace the small amounts of oxygen in the oil. Oxidative deterioration of oils which undergo storage is a common phenomenon, and limits the useful lifetime of the oil. In addition, oil obtained from oilseeds which have been stored for a substantial period of time after harvest is often higher in oxidation products that oil from seeds obtained from freshly harvested oil.

In the first step of lipid oxidation, double bonds react with oxygen to form allylic hydroperoxides (also known as peroxides). Because they originate from a first step of oxidation, hydroperoxides are considered to be primary oxidation products. They are routinely quantified by a standardized peroxide value test. Good quality oil, which is relatively bland in flavor and low in odor, will generally have a low Peroxide Value (PV). The PV of food oils delivered to food processors is often requested to fall below a specified value to ensure that the foodstuffs produced will be of high quality.

Peroxides are unstable and readily undergo further reactions. A low PV is not the only marker for good oil quality, because the PV of an oil may reach a high level and then decline as peroxides are further broken down into so-called secondary oxidation products. The breakdown of peroxides is complex and incompletely understood, the number of possible secondary oxidation compounds is large, complex, and incompletely classified, and the analysis of secondary oxidation products can be difficult.

One classification system sorts the secondary oxidation products into three groups on the basis of the size of the resulting molecules. Although many high molecular weight unsaturated lipids have no distinctive flavor themselves, their breakdown compounds have intense flavors, which affect the quality and stability of oils. Some secondary oxidation products are of lower molecular weight than the original lipid, and thus are more volatile than the starting lipid and peroxides. These secondary oxidation products are problematic in the edible oil industry. The volatile low molecular weight compounds include aldehydes, carbonyls, ketones, alcohols, acids, esters, ethers, hydrocarbons, and lactones. (Reactions associated with double bonds, in Fatty Acid and Lipid Chemistry, F. Gunstone, Aspen Publishers, Gaithersburg, Md. USA, 1999). Many of these compounds can be tasted or smelled even at very low concentrations and have potent, often undesirable odors or flavors which detract from the quality of edible oil or food made therefrom. Other secondary oxidation products have approximately the same molecular weight as the original allylic hydroperoxide; in this classification, these can be termed rearrangement products. The third group of secondary oxidation products comprises compounds of higher molecular weight than the starting lipid and peroxides, such as polymers which may be formed by condensation, crosslinking, or other types of polymerization reactions.

Another classification system sorts the secondary oxidation products into at least four categories based on standardized analytical methods (Lipid Oxidation, E. Frankel, The Oily Press, Dundee, Scotland 1998). One standard test, the Total Carbonyl Content, measures aldehydes and ketones resulting from the decomposition of hydroperoxides. A second test is the Malondialdehyde test, which is selective for malondialdehyde, a doubly oxidized product resulting from oxidation of polyunsaturated oils. A third test detects Thiobarbituric Acid Reactive Substances (TBARS). This test, also known as the TBAR test, measures a large number of volatile secondary oxidation products. As most edible oil is treated by steam deodorization before being sold, many TBARS may be removed in processing. A fourth test is the Anisidine Value Test, which measures carbonyls formed from lipid oxidation, such as 2-alkenals and 2, 4 dienals. This test is especially useful for quantifying deterioration of oils high in linolenic acid, an 18 carbon polyunsaturated fatty acid containing three double bonds. In addition, oxidative dimers of triglycerides, aldehyde-glycerides, and core aldehydes are known to contribute to high anisidine values.

The anisidine value test is based on the detection of carbonyl compounds, primarily aldehydes, which arise through oil oxidation. These compounds and their breakdown products affect the stability and quality of oils. Standard methods published by the American Oil Chemists' Society (AOCS) are often used to measure characteristics of lipids. AOCS method Cd 18-90 ("Official Methods and Recommended Practices of the AOCS", Fifth Edition, Second Printing (2004) American Oil Chemists' Society, Champaign, Ill.,) is widely used to measure anisidine values of lipids. Color reversion is a phenomenon in which refined oils become darker upon storage; it is known to be related to the degree of secondary oxidation of oils, which can be measured by anisidine value. Some of the anisidine-reactive materials, such as 2,4-dienals and trans-2-alkenals have been reported to have cytotoxic effects on experimental animals. The anisidine value (AV) of freshly processed oils can be used as a rough predictor of the future storage stability of that oil. Generally the anisidine value of good oil is less than 10 (Classical analysis of oils and fats, in, Analysis of oils and fats, edited by R. J. Hamilton and J. B. Rossell, Elsevier Applied Science Publishers, London, 1986). Anisidine value is also known as para-Anisidine Value (pAV). For these reasons, the AV is an important quality factor for edible oils.

Adsorptive treatment that reduces the AV of fats and oils would be useful in a broad arena of fats and oils. Indeed, the removal of secondary oxidation products is not deemed to be cost effective on a large scale: "While hydroperoxides are easily reduced by conventional purification, it is not economical to remove the secondary lipid oxidation products on an industrial scale" (p. 593 of, "The effect of lipid oxidation on the activity of interesterification of triglyceride by immobilized lipase" Nezu Toru; Kobori, Satoru; Mastumoto, Wataru. Editor(s): Yano, Toshimasa; Matsuno, Ryuichi; Nakamura, Kozo. Dev. Food Eng., Proc. Int. Congr. Eng. Food, 6th (1994), Meeting Date 1993, 591-3. Publisher: Blackie, Glasgow.

Lipid oxidation often takes place in lipids upon storage. Antioxidants may delay the onset of lipid oxidation for a period of time. In addition, lipid oxidation may occur in oilseeds on storage. Thus oil extracted from seeds which have been stored for more than three months after harvest season is often higher in oxidation products than oil extracted from seeds obtained early in a harvest season. As the seed ages in storage, oxidative indicators, such as anisidine value, may rise. Oil made from seed which has been stored for greater than three months may have deteriorated, and have unacceptably high levels of oxidation products. Storage damage reduces the quality of oil (Altschul, A, "Biological processes of the cottonseed" in Cottonseed, Alton E. Bailey, Editor, Interscience publishers, New York 1948 p 157-212). For example, cottonseed is harvested in the USA in Autumn and goes into storage in October and November. Oil produced from this seed in the first three months of storage will usually have a predictable low anisidine value. However, when the warm summer months (June-August) arrive, the anisidine value of oil produced from the seed rises, peaking in mid-September. The anisidine value of oil produced from stored seeds can be greater than 10, which is unacceptably high for some applications and food manufacturers may have difficulty making food which meets quality specifications when only such cottonseed oil is available. There is a need for a treatment which allows cottonseed oil of sufficiently low anisidine value and sufficiently high Oxidative Stability Index (OSI) value to be produced from stored seed. Other oilseeds, including corn and soybeans, are subject to storage. This and other conditions may result in oil having high peroxide values, high anisidine values and/or poor OSI values. A process for reducing the peroxide value and/or anisidine value of oils would be of value to the food industry. Similarly, a process whereby OSI values are increased would be valuable. Oxidative Stability Index is measured according to AOCS method Cd 12b-92.

Lipid oxidation is also a known problem in commercial frying operations since the frying process subjects oil to high temperatures and moisture, which accelerate lipid oxidation. Consequently, the operational lifetime of frying oil may be limited as oxidation reactions proceed, diminishing the quality of the oil and food prepared in it and necessitating cleaning and/or replacement of the oil.

The present teaching addresses these problems and others, and provides further advantages that one of ordinary skill in the art will readily discern from the detailed description that follows.

SUMMARY OF THE INVENTION

Lipids reduced in anisidine value are provided. Lipids having an anisidine value are treated with active substances to provide lipids having a lower anisidine value. The treatment can be carried out on oils or fats in the course of refining, or may be carried out on stored oil, oils obtained from stored seeds, or used oils, such as used frying oils, to extend the useful life of the oil.

Methods of producing active substances useful for reducing the anisidine value of oils and fats are provided. Solid, liquid, or gaseous active substances may be contacted with oil directly to provide oil having reduced anisidine value. Liquids may be immobilized, such as by mixing with inert solids, before being contacted with oil to provide oil having reduced anisidine value.

Liquids may be provided by purchasing dry active substances and preparing solutions of active substance. Liquids may be obtained from fermentation broths containing active substances.

DETAILED DESCRIPTION OF THE INVENTION

In one aspect, provided herein are methods and systems for reducing the anisidine value of food lipids and in particular embodiments, reducing the anisidine value of food oils and fats that are extracted from oilseeds in an oilseed processing facility. The methods include contacting the lipid with an active substance or active material, which is defined herein to mean any material that will reduce the anisidine value of the lipid. Although active materials include compositions as diverse as sodium borohydride, sodium methoxide, alumina and silicates, it has been surprisingly found that compositions containing amino groups are particularly active substances. While not being bound by theory, it is believed that active materials containing amino groups chemically interact with the carbonyl groups, such as the dienals and trans-alkenals of oxidized lipids to reduce the oxidation state of the lipid or to form a non-repugnant derivative thereof such as for example, a Schiff's base compound, thereby lowering the anisidine value. Accordingly, fats and oils treated with active substances to reduce the anisidine value as provided herein will have a different chemical composition than lipids that are not treated by the process, and therefore form a novel product by process composition, which is another aspect of the present teaching.

Because lipids are hydrophobic and amino groups are hydrophilic, it is beneficial in certain embodiments to contact the lipids with active materials that are bound to, embedded in, or otherwise dispersed on a solid support. In certain particular embodiments, the active material is an anion exchange resin having an amino group bound to a resin. In alternative embodiments, the active material may be lysine, protein, peptides or even a crude source of such materials, such as a cell free fermentation broth used for the preparation of amino acids. Such active materials may be immobilized, embedded or dispersed on a solid support by a variety of means known to one of ordinary skill in the art. In other embodiments, however, the active material may be contacted with the lipid in a liquid or gas form rather than be bound on a solid support. Thus, it will be seen that the preparations of the present disclosure can be prepared and utilized in a variety of ways, to accomplish the purpose of reducing the anisidine value of lipids.

The instant disclosure is applicable to a wide variety of olefinic lipids. Non-limiting examples of the lipids that may be used in embodiments of the present disclosure include seed oil, fish or marine oil, animal oil or fat, nut oils, canola oil, vegetable oil, safflower oil, sunflower oil, nasturtium seed oil, mustard seed oil, olive oil, sesame oil, soybean oil, corn oil, peanut oil, cottonseed oil, rice bran oil, babassu nut oil, castor oil, palm oil, palm kernel oil, rapeseed oil, low erucic acid rapeseed oil, palm kernel oil, lupin oil, jatropha oil, coconut oil, flaxseed oil, evening primrose oil, jojoba, tallow, beef tallow, butter, chicken fat, lard, dairy butterfat, shea butter or combinations thereof. Lipids may be fully or partially processed.

Lipids, such as oils or fats, may be obtained by any process used in oil refining, including but not limited to solvent extraction, supercritical fluid extraction, pressing, or combinations. In oils obtained by solvent extraction, the instant disclosure may be applied to the oil/solvent mixture, known as "miscella", or to the oil or fat after solvent is removed, known as "crude oil." Pressed or expressed oil is known as "press oil." Some oilseeds are processed by sequential application of steps; for example, canola oil may be obtained first by pressing the oilseed to obtain expressed crude oil and press cake. The oil remaining in the press cake is removed by solvent extraction with hexane to produce miscella. After removing solvent from the miscella, solvent-extracted crude oil is obtained. The expressed crude oil and the solvent-extracted crude oil may be combined to obtain crude canola oil.

Crude oil is further processed by methods well known in the art. For example, degumming may be carried out by adding a small amount of phosphoric acid to the crude oil, followed by adding a small amount of water and separating a water-rich gum phase containing phospholipids to obtain a degummed oil. The water is applied as a wash liquid, so water addition constitutes washing the crude oil. Refining may be carried out by adding a small amount of an alkali substance to degummed oil and centrifuging to remove a water-rich soapstock phase containing salts of fatty acids (soaps) to obtain refined oil. The water is applied as a wash liquid, so water addition constitutes washing the degummed oil. Alternatively, the steps of degumming and refining may be combined to provide a refined oil. In the processing of corn oil, oil so treated is called once-refined oil (OR oil). Refined oil may be subjected to a bleaching step by heating with a solid bleaching earth to remove impurities, including color bodies and residual soaps, and filtering to proved refined, bleached oil (RB oil). RB oil may be treated by subjecting it to a deodorization step, in which the oil is heated under vacuum and treated by injecting (or sparging) steam into the oil to remove volatile substances and obtain deodorized oil. Oil which has been subjected to refining, bleaching and deodorizing may be called refined, bleached and deodorized oil (RBD oil). Alternatively, physical refining may be applied to crude or degummed oil. The lipids in the instant invention may be finished, fully processed oils, or may be partially processed oils taken at any step in processing. Before lipids are contacted with active substance as defined herein, they are untreated lipids.

Diacylglycerol oil (DAG oil) differs from conventional oils and fats in that it is enriched in diacylglycerols. Synthetic routes for diacylglycerols include removing fatty acids from triacylglycerols, building diacylglycerols from glycerol and free fatty acids, and removing phosphatidyl groups from phospholipids. In one embodiment, a commercial DAG oil sold under the trade name Enova comprising 80% diacylglycerols may be obtained from ADM-Kao, Decatur Ill., USA.

Amino acids are basic structural units of proteins. An amino acid has at least one amino group, and some amino acids with basic side chains have at least one additional amino group. Such amino acids include lysine, arginine and histidine. An amino group can react with materials known to increase AV of lipids, such as aldehydes and ketones.

A large surface area is beneficial for efficient contact between lipids and substances which reduce AV. Thus, porous materials, such as silica gel or bleaching clay, provide large surface area for amino acids and may be used in embodiments of the instant invention. Non-limiting examples of the carrier or support that may be used in embodiments of the present disclosure include activated carbons, natural minerals (such as clays), processed minerals (such as acid activated and granular clays), diatomite, kaolin, talc, perlite, various silica products, alumina, zeolite, starches, molecular sieves, quartz sand, limestone, fibrous materials (such as cellulose or microcrystalline cellulose), rice hull ash, porous glass, porous ceramics, celite, porous metallic particles such as titanium oxide, stainless steel or alumina, porous silica gel, molecular sieve, active carbon, clay, kaolinite, perlite, glass fibers, diatomaceous earth, bentonite, hydroxyapatite, calcium phosphate gel, and alkylamine derivatives of inorganic carriers. Non-limiting examples of organic carriers include microporous Teflon, aliphatic olefinic polymer (e.g., polyethylene, polypropylene, a homo- or copolymer of styrene or a blend thereof or a pretreated inorganic support), nylon, polyamides, polycarbonates, nitrocellulose and acetylcellulose. Other suitable organic carriers include hydrophilic polysaccharides such as agarose gel with an alkyl, phenyl, trityl or other similar hydrophobic group to provide a hydrophobic porous surface. Microporous adsorbing resins include those made of styrene or alkylamine polymer, chelate resin, ion exchange resin such a "DOWEX MWA-1" (weakly basic anion exchange resin manufactured by the Dow Chemical Co., having a tertiary amine as the exchange group), and hydrophilic cellulose resin such as one prepared by masking the hydrophilic group of a cellulosic carrier, e.g., "Cellulofine GC700-m™" (product of Chisso Corporation, 45-105 μm in particle size). Textured proteins having a rigid texture and an expanded, open structure which provides greater surface area to interact with oil, thus conferring substantial advantages over conventional protein in its use for oil treatment. According to one embodiment of the present approach, TVP® brand textured vegetable protein available from Archer-Daniels-Midland Company of Decatur, Ill. is used. Advantages conferred by the texturizing process include particle rigidity and increased surface area relative to the untextured protein. Other treatments such as typical soybean expanders and collet forming devices may also be used to confer desired properties on protein. Suitable protein can also be the textured vegetable proteins described in U.S. Pat. Nos. 4,103,034 and 4,153,738, which are hereby incorporated in their entirety by reference.

Ion exchange compounds, such as resins, are generally classified according to three criteria: 1) the nature of their functional groups; 2) the chemistry of the matrix supporting the functional group; and 3) the porosity of the matrix supporting the functional group ("Ion Exchange" in Kirk-Othmer Encyclopedia of Chemical Technology, Fourth Edition (vol. 14), p b737-741; John Wiley & Sons, New York, 1995). The four primary types of ion exchange functionality are strong acid, weak acid, weak base, and strong base. Strong acids or bases are generally differentiated from weak acids of bases by the ability of strong acids and bases to split neutral salts, such as sodium chloride. Solid ion exchangers are most often formed as resins. Acidic ion exchange resins, also known as cationic, are often in the hydrogen form for use. In this form, when contacted with liquid containing cations, hydrogen associated with the ion exchange resin is able to leave the solid phase and enter the liquid phase as it is exchanged with cations in the liquid phase. Basic ion exchange resins, also known as anionic, are often in the hydroxide form. In this form, when contacted with a liquid containing anions, hydroxide associated with the ion exchange resin is able to leave the solid phase and enter the liquid phase as it is exchanged with anions in the liquid phase. In addition, other ion exchange resins may have the ability to chelate metals. Ion exchange interactions are reversible, which allows regeneration procedures to return an ion exchanger to the desired form for reuse. Suitable anion exchange resins in the present disclosure include Relite RAD/F and WA21J (both from Mitsubishi Chemical Company, White Plains, N.Y.), and Duolite A7 (an amine-based ion exchange resin from Rohm and Haas, Pittsburgh, Pa.), as available from the manufacturers in 2005.

Ion exchange resins and other compounds may be contacted with process liquids, such as oils, in a batch mode or a continuous mode. Continuous operation is desirable. In one embodiment, active materials may be packed into a column and lipid passed through the column to effect the treatment of the present disclosure. In another embodiment, several columns may be supplied so that when one column is spent, flow may be diverted to a fresh column for uninterrupted treatment of lipid. In this embodiment, the spent column may be regenerated before being returned to service. In another embodiment, the treatment and regeneration process may be automated. One embodiment of continuous operation is simulated moving bad chromatography.

Anion exchangers are generally amine-based resins. Strong base anion exchange resins have functional groups comprising quaternary ammonium groups. Weak base anion exchangers have functional groups comprising primary, secondary, or tertiary amines.

Ion exchangers are most often used in aqueous conditions. Ion exchange resins containing water may present difficulties in contacting a lipid. In one embodiment of the present disclosure, water is removed from ion exchange resins. In another embodiment, water removal is effected by washing ion exchange resin with a water-miscible solvent, followed by washing with a water-immiscible solvent having miscibility with lipid. The water-immiscible solvent may be displaced by process lipid.

Most amino acids, peptides, and proteins have poor solubility in lipids. When these compounds are contacted with lipids, they clump together and minimize the surface in contact with the oil. Energy input, such as stirring, is required to disperse the amino acids, peptides or proteins in the oil. Subsequent recovery of these agents from the oils can be very difficult. As with many amino acids, peptides and proteins are often very fine powders, and passing oil through a bed of the amino acids, peptides or proteins may be very difficult. High back pressure is often obtained due to resistance of the two phases to interaction. Channeling of the liquid oil may occur, limiting the degree of contact between liquid and solid.

These limitations may be overcome by dispersing the amino acids, peptides or proteins onto a second substance, such as a support. This dispersion may be described as dispersed, deposited, immobilized, adsorbed, coated, or bound. For example, lysine dispersed on a support may be described as dispersed lysine, deposited lysine, immobilized lysine, adsorbed lysine, lysine-coated support, bound lysine, or other synonyms known to those of ordinary skill in the art of coating proteins or amino acids onto other materials. One embodiment is lysine-coated silica. Common to these terms is the characteristic that the amino acids, peptides or proteins coated onto the support have little tendency to desorb from the support in the lipid being treated. In one embodiment, when lysine was coated onto silica to produce lysine-coated silica, lysine was undetectable in lipids contacted with the lysine-coated silica at detection limits of 0.05 ppm.

Compounds such as amino acids, peptides and/or proteins may be dispersed or coated by a variety of processes. In one embodiment, a water solution of amino acids, peptide or protein or other active substance can be simply mixed with a support to form a slurry. What is meant by active substance is a compound capable of reducing the AV of a lipid. The water may be removed by evaporation to provide an active substance dispersed or coated on a support. In another embodiment, the slurry of active substance and support may be incubated to allow adsorption of active substance onto the support, filtered to remove liquid, and remaining water removed by evaporation to provide an active substance dispersed or coated on a support. In another embodiment, addition of a polar solvent such as acetone to the slurry of active substance and support causes precipitation of the active substance onto the support. Subsequent removal of water and solvent, such as by filtration and evaporation, provides an active substance dispersed or coated on a support.

Alternatively, active substances can be linked to a support covalently, or cross linked to enhance structural stability. Such methods are well-known in the art of enzyme immobilization (see U.S. Pat. Nos. 6,156,548 and 6,582,942, each of the contents of the entirety of which is incorporated by this reference).

In another embodiment, the support can be packed into a column to form a bed and a solution of active substance passed through the bed to allow the active substance to adsorb onto the support. Before use with oil, the bed may be treated to remove water, such as by applying vacuum, passing dry air through the bed, or by passing solvents through the bed. The latter is often carried out by passing a succession of increasingly non-polar solvents through the wet bed, such as ethanol followed by hexane. Alternatively, the solution of active substance can be sprayed onto the support, such as in an agglomorator.

Solutions of active substances, including amino acids, peptides and proteins, can be obtained by dissolving compounds, concentrates or dried fermentation broths in water. Active substances of varying purity are widely available commercially. In one embodiment, dried fermentation broth can be dissolved to obtain a solution of active substance. In another embodiment, the solution may be contacted with a lipid to reduce the anisidine value of the lipid. In one embodiment, the solution may be dispersed on a support to provide a broth-immobilized, or broth-coated, support. In another embodiment, the water content of the broth-coated support may be reduced. In an embodiment, a dried fermentation broth enriched in lysine can be dissolved in water to provide a solution of active substance suitable for dispersion onto a support to obtain a broth-coated support. In an embodiment, a liquid fermentation broth may be contacted with a lipid to reduce the anisidine value as compared to untreated lipid. In a further embodiment, a liquid fermentation broth is contacted with a support to obtain a broth-coated support. In one embodiment the fermentation broth may be subjected to further processing steps, such as fractionation, purification, or concentration steps to increase the content of active substance. A suitable example of a dried fermentation broth is L-Lysine Monohydrochloride 98.5% Feed Grade, obtainable from Archer Daniels Midland, Decatur Ill., containing 78.8 isomerically pure L-Lysine. In another embodiment, fermentation broth can be concentrated and used as the solution of active substance without addition of water. An embodiment comprises ADM Liquid L-Lysine (50%; Archer Daniels Midland, Decatur Ill.), an aqueous solution of L-Lysine free base. It is a dark brown liquid obtained by concentrating lysine from a fermentation broth. In another embodiment, fermentation broths containing active substances can be used as a solution of active substance. Such fermentation broths are produced by incubating a microorganism in a fermentation medium by methods known in the art. The microorganism transforms the fermentation medium into a fermentation broth enriched in one or more active substances. In one embodiment, an active substance comprises a fermentation broth. In another embodiment, an active substance comprises a fermentation broth that has been diluted with another liquid. In another embodiment, an active substance comprises a fermentation broth that has been concentrated, such as by removal of water. In another embodiment, an active substance comprises a fermentation broth that has been purified to increase the content of active substance. In one embodiment, a fermentation broth enriched in lysine may be produced by incubating a bacterium, such as a strain belonging to the genus *Corynebacterium*, in the presence of nutrients and substrates such as dextrose or molasses.

In another embodiment, the lipid may be contacted with an active substance that is liquid. Oil from any step in processing may be contacted with a solution having an active substance. In one embodiment, a water solution of amino acids, peptide, protein and/or other active substance is prepared by dissolving the active substance in water or a buffer. The lipid is washed or contacted with the solution of active substance. After a period of incubation, the water phase is removed by suitable means, such as centrifugation, or settling and decantation of oil. In another embodiment, the solution of active substance may be used to supplement or replace the water phase used in degumming or alkali refining steps of oil refining. In another embodiment, oil may be treated by contacting or washing with a water solution containing an active substance, such as a fermentation broth. In another embodiment, the fermentation broth containing an active substance may be used to supplement or replace the water phase used in degumming or alkali refining steps of oil refining.

In another embodiment, the lipid may be contacted with a gaseous compound. In one embodiment, a gaseous active substance is bubbled through a lipid. In another embodiment, lipid in contact with a headspace of gas is subjected to intimate mixing, such as by use of a wand mixer, application of ultrasound, vigorous stirring, or passage of lipid and gas through a loop reactor. After mixing, active gas may be removed by known methods including but not limited to application of vacuum, washing with water, bubbling gas through the lipid and sparging steam through the lipid, or any combination of the above.

After treatment of lipid by one of the embodiments described herein, the lipid can be further processed, such as by hydrogenation, and/or used as a food oil. Oils are present in a wide variety of foods in their liquid, partially hardened and hardened states. In one embodiment, the oil may be subjected to partial hydrogenation to obtain a partially hydrogenated or partially hardened oil. In another embodiment, the oil may be fully hydrogenated to obtain a fully hydrogenated or fully hardened oil. In another embodiment, lipid treated by the present disclosure may be subjected to interesterification, transesterification, or hydrolysis. In another embodiment, oil treated by the present disclosure is useful as a frying medium. In one embodiment, oil, including but not limited to, corn oil, treated by the present disclosure may be used to fry food, such as potatoes. In another embodiment, cottonseed oil treated by the present disclosure may be used to fry food. Alternatively, oils treated by the process of the present disclosure may be incorporated into baked goods, frozen foods, and other applications known to those of ordinary skill in the art.

Corn oil and cottonseed oil are attractive oils due to their stability and flavor properties. Oilseeds such as corn, cottonseed and soy are typically harvested at the end of a growing season, and part of the crop is stored before processing to make oil. Often, oil produced from "old crop" seed, which may have been stored for 8 months or more before processing to extract oil, has a higher AV than oil produced from "new crop" seed. Cottonseed oil (prime bleachable summer yellow, PBSY) is one oil that may exhibit this characteristic, so that oil processed from older seeds has an undesirable high AV. Alternatively, oil may be processed and stored before sale or use. During storage, the AV of finished oil may rise. In either case, a simple, cost-effective process for reducing AV is highly desirable to provide oil of sufficient quality.

Oil is marketed on the basis of several specifications. Some users of oil require that the oil the purchase must be below a certain anisidine value to allow them to manufacture products of adequate quality. A process which reduces the anisidine value of oil having a high anisidine value, such as oil produced from aged seed, or oil that has been stored, would benefit both producers and users of oil. In one embodiment, oil having a high anisidine value because it is made from seed which had aged several months after harvest is treated to reduce the anisidine value, and marketed by the supplier as having a reduced anisidine value as compared to untreated oil.

Oil is widely used as a frying medium in the production of a broad variety of food. In most cases, the anisidine value of the oil increases after a period of use in frying. The used frying oil may be passed through a conduit into a container holding a purification medium, such as a bed of diatomaceous earth, to remove solid impurities in the oil, and returned to the fryer for continued use through a conduit. A method for reducing the anisidine value would provide a greater benefit. In one embodiment, an active substance is packed into a column, and the column is fitted into the conduit. Fryer oil that has been passed through the container holding a purification medium is passed through the column of active substance to provide a treated oil having a reduced anisidine value as compared to used fryer oil. In another embodiment used frying oil is passed through a column of active substance to provide an oil having a reduced anisidine value as compared to untreated used frying oil.

The invention is further explained by use of the following illustrative examples.

EXAMPLE 1

In one embodiment, fresh refined, bleached, deodorized (RBD) soy oil (ADM, Decatur West refinery, Decatur, Ill., USA) was heated to 260° C. under vacuum (25 inches) for 30 minutes and the anisidine value was determined by AOCS method Cd 18-90. The peroxide value (PV) decreased during heating and was accompanied by a large increase in anisidine value (AV). This is due to the breakdown of primary oxidation products (peroxides) into secondary oxidation products such as the secondary oxidation products which can be determined by AOCS method Cd 18-90. A description of that well known method may be found for example, in "Official Methods and Recommended Practices of the AOCS", Fifth Edition, Second Printing (2004) American Oil Chemists' Society, Champaign, Ill., which is incorporated herein by reference.

TABLE 1

| Time (min) | AV |
|---|---|
| 0 | 1.92 |
| 5 | 5.82 |
| 15 | 7.92 |
| 30 | 9.79 |

EXAMPLE 2

In another embodiment, slightly oxidized soy oil (200 grams) having an Anisidine Value (AV) of 2.34 was treated with 2.5 wt % (5 grams) sodium borohydride ($NaBH_4$) at 70° C. in a batch reactor for 80 minutes and the anisidine value was determined substantially as described in example 1. The AV of the treated oil decreased to 1.71; thus, the AV was reduced by 27% as compared to the slightly oxidized soy oil by this treatment.

EXAMPLE 3

In yet an additional embodiment, refined, bleached (RB) soy oil (ADM, Decatur West refinery, Decatur, Ill., USA) was stirred with active substances (i.e., alumina beads and ion exchange resin) for 60 minutes and the anisidine value was determined substantially as described in example 1. Alumina beads (Selexsorb CD) were obtained from Alcoa Industrial Chemicals, Pittsburgh, Pa. Ion exchange resin (5%, Relite RAD/F) was from Mitsubishi Chemical Company, White Plains, N.Y.

TABLE 2

| | Temperature | Initial AV | Final AV |
|---|---|---|---|
| Sodium methoxide (0.5 wt %) | 70° C. | 1.55 | 1.29 |
| Selexsorb alumina beads (5 wt %) | 50° C. | 1.53 | 1.17 |
| Relite RAD/F (5 wt %) | 70° C. | 1.38 | 0.11 |

As indicated by the numbers in Table 2, sodium methoxide, alumina, and Relite RAD/F ion exchange resin were each effective at reducing the AV of RB soy oil as compared to untreated oil, the latter to less than 10% of the original value.

EXAMPLE 4

In another non-limiting embodiment, RBD soy oil (ADM, Decatur West refinery, Decatur, Ill., USA) was stirred with 5% Duolite A7 (an amine-based ion exchange resin from Rohm and Haas, Pittsburgh, Pa.) resin at 50° C. for 80 minutes and the anisidine value was determined substantially as described in example 1. After 80 minutes of stirring, the AV had been reduced by 20% as compared to untreated oil as indicated in Table 3.

TABLE 3

| Time (min) | AV |
|---|---|
| 0 | 2.26 |
| 10 | 2.06 |
| 20 | 2.1 |
| 40 | 1.9 |
| 80 | 1.8 |

EXAMPLE 5

In yet a further embodiment, RBD cottonseed oil (ADM, Memphis, Tenn., USA) was stirred with an amine-based ion exchange resin (WA21J from Mitsubishi Chemical Company, White Plains, N.Y.) at 70° C. for 120 minutes and the anisidine value was determined substantially as described in example 1. After 120 minutes of stirring, the AV was reduced by 27% as compared to untreated oil as indicated in Table 4.

TABLE 4

| Time (min) | AV |
|---|---|
| 0 | 13.6 |
| 20 | 12.8 |
| 60 | 10.95 |
| 120 | 9.98 |

EXAMPLE 6

In a further embodiment, cottonseed oil (prime bleachable summer yellow (PBSY) or RBD) from different lots was stirred with active substances listed in Table 5 at the temperatures indicated in the table and the anisidine value was determined substantially as described in example 1. Solid active substances were added to the oil and stirred for 20 minutes. Where vacuum is indicated, the vacuum applied was a 29-inch vacuum.

TABLE 5

| | AV | | |
|---|---|---|---|
| Treatment | Before | After | AV Reduction (%) |
| PBSY cottonseed oil | | | |
| 5% magnesium silicate, 60° C. | 0.97 | 0.64 | 34 |
| RBD cottonseed oil | | | |
| 5% magnesium silicate, 60° C. | 12.62 | 9.69 | 23 |
| 2% magnesium silicate, 110° C., vacuum | 11.01 | 9.06 | 18 |
| 5% silica hydrogel, 90° C., vacuum | 12.62 | 10.87 | 14 |
| 5% silica gel, 60° C. | 12.62 | 10.42 | 17 |
| 2% carbon, 110° C., vacuum | 11.01 | 9.31 | 15 |

The AV of PBSY cottonseed oil was reduced by 34% after treatment with 5% magnesium silicate at 60° C. as compared to untreated oil. The AV of RBD cottonseed oil was reduced with all treatments, by 15-23% as compared to untreated oil as indicated in Table 5.

EXAMPLE 7

In yet an additional embodiment, Duolite A7 resin (45 ml) was oven-dried at 70° C. for 12 hr to 15% moisture and packed in a jacketed glass column (1.5 cm diameter, 30 cm long). RB soy oil (ADM, Decatur West refinery, Decatur, Ill., USA) was kept under nitrogen at room temperature and passed through the packed Duolite A7 resin from the top at the rate of 45 grams/hour. The column temperature was maintained at 70° C. and the anisidine value was determined substantially as described in example 1. The AV of the untreated oil was 1.0 and did not increase in the RB soy oil fed to the column during the experiment.

TABLE 6

| Time | AV | AV reduction (%) |
|---|---|---|
| Untreated | 1.00 | — |
| Day 1 | 0.22 | 78 |
| Day 2 | 0.49 | 51 |
| Day 3 | 0.56 | 44 |
| Day 4 | 0.70 | 30 |
| Day 5 | 0.75 | 25 |
| Day 6 | 0.60 | 40 |

The AV of the oil effluent from the column had been reduced by 78% as compared to untreated oil on the first day; on subsequent days, significant AV reduction continued but in decreasing amounts as indicated in Table 6.

EXAMPLE 8

In a further embodiment, RB soy oil (ADM, Decatur West refinery, Decatur, Ill., USA) having an anisidine value of 2.28 was passed through a column of dried Duolite A7 substantially the same as described in example 7, except the flow rate was 25 grams/hour, and the anisidine value was determined substantially as described in example 1. After running the column overnight at 70° C., the AV of oil exiting the column was 1.03 (55% AV reduction as compared to untreated oil). The column temperature was raised to 85° C., the AV of the treated oil exiting the column was 0.88 (61% AV reduction as compared to untreated oil).

EXAMPLE 9

In yet an additional embodiment, RB cottonseed oil (ADM, Valdosta, Ga.) was passed through a column packed with dried Duolite A7 resin substantially the same as described in example 7, except at different temperatures and flow rates as listed in Table 7 and the anisidine value was determined substantially as described in example 1.

TABLE 7

| Temp | Oil flow (g/hr) | AV | AV reduction (%) |
|---|---|---|---|
| Untreated | | 18.22 | |
| 70° C. | 29.4 | 6.45 | 65 |
| 70° C. | 55.2 | 5.11 | 72 |
| 70° C. | 118.2 | 10.96 | 40 |
| Untreated | | 18.58 | |
| 85° C. | 32.4 | 6.32 | 66 |
| 85° C. | 58.2 | 6.87 | 63 |
| 85° C. | 117.0 | 10.76 | 42 |
| Untreated | | 18.58 | |
| 40° C. | 54.0 | 9.14 | 51 |

The AV reduction ranged from 40% to 72% as compared to untreated oil. Faster flow rates (shorter retention time) resulted in smaller reductions in AV at flow rates greater than 55 g/hr. AV reduction at a given flow rate increased with temperature as indicated in Table 7.

EXAMPLE 10

In yet a further embodiment, two lots of RB cottonseed oil were treated by passage through a column of dried Duolite A7 resin as described in Example 7, with one lot at 40° C. and the other lot at 70° C., and the anisidine value was determined substantially as described in example 1. Each lot of oil was deodorized and the anisidine value was determined substantially as described in example 1. RB cottonseed oil was deodorized after passage through the column of Duolite A7 resin by taking up the treated oil in a vessel. The vessel was fitted with a sparge tube, one opening of which was below the top of the oil level. The other opening of the sparge tube was connected to a vessel containing deionized water. The sparge tube was set to provide a total content of sparge steam of 3% by weight of oil throughout the deodorization process. The vessel was also fitted with a condenser through an insulated adapter. A vacuum line was fitted to the condenser, with a cold trap located between the condenser and the vacuum source. Vacuum (Max. 1 torr) was applied and the oil was heated to 240° C. at a rate of 10° C./minute. This temperature was held for 30 minutes. A heat lamp was applied to the vessel containing deionized water to generate steam; the vacuum drew the steam through the sparge tube into the hot oil, providing sparge steam. After 30 minutes the vessel was removed from the heat source. After the oil had cooled to below 100° C., the vacuum was broken with nitrogen gas.

TABLE 8

| | Anisidine Value | |
|---|---|---|
| Column Temperature | Before deodorization | After deodorization |
| No column | 18.62 | 9.67 |
| Column at 40° C. | 11.14 | 7.39 |
| Column at 70° C. | 8.28 | 5.94 |

Although the deodorizer treatment was effective at reducing AV, the combination of treatment with Duolite A7 resin and deodorization was more effective than either treatment as indicated in Table 8.

EXAMPLE 11

In yet an additional embodiment, RBD cottonseed oil (ADM, Memphis, Tenn.) having an anisidine value of AV 12.94 (with citric acid (30 ppm) added as antioxidant) was fed at 0.98 g/min to a column of dried Duolite A7 resin at 70° C. substantially as described in example 7 and the anisidine value was determined substantially as described in example 1. The AV of treated oil was reduced to 9.2 (29% reduction in AV as compared to untreated oil).

EXAMPLE 12

In another embodiment, RBD cottonseed oil was passed through a column of dried Duolite A7 substantially as described in example 7 except the column temperature was 85° C., and the anisidine value was determined substantially as described in example 1; a reduction in AV of 46% at 85° C. as compared to untreated oil was obtained.

EXAMPLE 13

In a further embodiment, RBD cottonseed oil (ADM, Memphis, Tenn.) having an anisidine value of 12.94 was passed through a jacketed glass column (1.5 cm diameter×30 cm height) containing 16 grams of dried Duolite A7 resin (resin volume, 47 ml) at 0.91-0.98 grams/minute as described in Example 7 and the anisidine value was determined substantially as described in example 1. The column temperature was maintained at 70° C. by passing warm water through the jacket. After passage through the resin bed, the AV of the RBD cottonseed oil was 9.20 (29% reduction). RB cottonseed oil (ADM, Valdosta, Ga.) having an anisidine value of 17.98 was passed through the column for several hours to flush the RBD oil and the anisidine value of the RB cottonseed oil was determined substantially as described in example 1 after several hours of flushing. After passage through the resin bed, the AV of the RB cottonseed oil was 6.56 (65% AV reduction as compared to untreated oil). The Duolite A7 resin was then subjected to a regeneration procedure. The resin was first washed with 150 ml (3× bed volume) ethanol. A 3% solution (wt/vol) of potassium hydroxide in ethanol was passed through the column for 52 minutes, at which point the pH of the eluted solution was 12-13. Subsequently, 700 ml of an ethanol/water solution (80% ethanol, 20% water) was passed through the column. The pH of the eluted solution was greater than 12. The resin was removed from the column and washed with several washes of deionized water totaling 1500 ml, after which the pH of liquid held in contact with the resin was 7. Subsequently, the resin was rinsed with acetone and air-dried, then packed into a column to form a dried regenerated resin bed. RBD cottonseed oil (ADM, Memphis, Tenn.) having an anisidine value of 12.45 was passed through the dried regenerated resin bed and the anisidine value was determined substantially as described in example 1. After passage through the resin bed, the AV of the RBD cottonseed oil was 8.48 (32% reduction in AV as compared to untreated oil). Subsequently, RB cottonseed oil (ADM, Valdosta, Ga.) having an anisidine value of 22.81 was passed through the column for several hours to flush the RBD oil and the anisidine value was determined substantially as described in example 1 after several hours of flushing. After passage through the resin bed, the AV of the RB cottonseed oil was 12.22 (46% reduction in AV as compared to untreated oil).

EXAMPLE 14

In yet a further embodiment, a Mitsubishi WA21J resin was oven-dried for 12 hr at 70° C. to a moisture content of 43%. Dried resin (45 ml volume) was packed in a jacketed glass column (1.5 cm diameter, 30 cm long) maintained at 70° C. RBD cottonseed oil having an anisidine value of 10.78 was fed at 25 g/hr through the column from the top and the anisidine value of oil exiting the column was determined substantially as described in example 1.

TABLE 9

|  | AV | AV reduction (%) |
|---|---|---|
| Day 1 | 10.45 | 3 |
| Day 2 | 10.18 | 6 |
| Day 3 | 9.08 | 16 |

Reduction of AV was observed as compared to untreated oil as indicated in Table 9.

EXAMPLE 15

In another embodiment, corn oil miscella was prepared by mixing corn oil obtained by pressing with hexane-extracted oil (both from ADM, Decatur West refinery, Decatur, Ill., USA) to form a corn oil miscella comprising 30% hexane and 70% corn oil. This miscella was passed through a column (2.5 cm diameter by 30 cm high) packed with 35 grams of dried RAD/F (formerly EXC04) resin (Mitsubishi) at room temperature and at 69 grams/hour, and the total amount of oil treated per gram of resin was determined. The anisidine value was determined substantially as described in example 1.

TABLE 10

| Hour | Anisidine value | Oil treated/ g resin (grams) |
|---|---|---|
| Initial value | 3.63 | — |
| 24 | 1.93 | 21.6 |
| 48 | 2.62 | 43.2 |
| 72 | 2.76 | 64.8 |
| 96 | 3.82 | 86.4 |

At 96 hours, the RAD/F resin was no longer effective at reducing the AV of OR corn oil. Each gram of resin could reduce the AV of at least 64.8 grams of OR corn oil as indicated in Table 10.

EXAMPLE 16

In one embodiment, corn oil miscella was prepared by mixing corn oil obtained by pressing with hexane-extracted oil (both from ADM, Decatur West refinery, Decatur, Ill., USA) to form a corn oil miscella comprising 30% hexane and 70% corn oil. Miscella was heated to 49° C. and the free fatty acid level was determined. Phosphoric acid (85%) was added during shear mixing to a level of 285 ppm. Then, a quantity of 11% NaOH (also known as caustic) solution equal to a 0.2% excess of the free fatty acids was added with shear mixing (caustic dosage=((0.142× acid %+0.2)100)/11) and the miscella was stirred for 40 minutes at 49° C. Miscella refining was completed by centrifuging the miscella and removal of solvent under vacuum on a rotary evaporator to produce miscella-refined oil and the anisidine value was determined substantially as described in example 1. Miscella-refined oil was bleached with 1.5% Perform 5000 activated bleaching clay for 5 minutes at 70° C. and 20 minutes at 110° C. substantially as described in Example 23 and the anisidine value was determined substantially as described in example 1. Refined, bleached oil was deodorized substantially as described in example 10 and the anisidine value was determined substantially as described in example 1. Alternatively, miscella refined oil was bleached in the same way except with the addition of 1% KBG carbon and the anisidine value was determined substantially as described in example 1. This oil was deodorized substantially as described in example 10 and the anisidine value was determined substantially as described in example 1.

TABLE 11

|  | After refining | After bleaching | After deodorizing |
|---|---|---|---|
| Miscella refined | 8.29 | 5.95 | 4.34 |
| Miscella refined and bleached with 1% carbon added | 7.02 | 5.55 | 3.29 |

Treatment of miscella-refined oil with carbon was effective at reducing AV after bleaching and deodorizing as compared to untreated oil as indicated in Table 11.

EXAMPLE 17

In another embodiment, hexane was added to OR corn oil having an AV of 12.87 to yield miscella, and refined substantially as described in Example 16. The miscella refining was completed by centrifuging the miscella and removal of solvent under vacuum on a rotary evaporator substantially as described in Example 16 and the anisidine value was determined substantially as described in example 1. After refining, instead of being bleached, the miscella refined corn oil was passed through a column of RAD/F substantially as described in example 15 and the anisidine value was determined substantially as described in example 1. Treated oil was deodorized substantially as described in example 10 and the anisidine value was determined substantially as described in example 1.

TABLE 12

|  | Crude oil | After refining | After RAD/F treatment | After deodorizing |
|---|---|---|---|---|
| Miscella refined | 12.87 | 7.42 | 3.16 | 1.99 |

Treatment with RAD/F was effective at reducing AV when used instead of a bleaching step; the AV after deodorizing was very low as compared to untreated oil as indicated in Table 12.

EXAMPLE 18

In yet an additional embodiment, RB soy oil (ADM, Decatur West refinery, Decatur, Ill., USA) with 200 ppm TBHQ antioxidant added was passed through a column (15 mm diameter, 15 cm height) of silica gel (Davisil grade 636, Aldrich Chemical Co., 12 g, bed height 13 cm) on four successive days and the anisidine value was determined substantially as described in example 1.

TABLE 13

| Run # | Feed AV | AV of oil after passing through silica gel | AV Reduction (%) |
|---|---|---|---|
| 1 | 1.68 | 1.68 | 0 |
| 2 | 1.8 | 1.66 | 8 |
| 3 | 1.8 | 1.7 | 6 |
| 4 | 1.46 | 1.46 | 0 |

The silica gel effected a slight reduction of AV in 2 cases as compared to untreated oil, but no reduction of AV in two cases as indicated in Table 13.

EXAMPLE 19

In another embodiment, free base lysine was purchased from Sigma Chemical and coated onto granular clay. To coat lysine onto granular clay, lysine was dissolved in deionized water at 50° C. before adding granular clay (Agsorb 30/60 LVM-GA, OIL-DRI, Chicago, Ill.) to the solution. The granular clay and lysine solution were mixed for 15 minutes before the liquid was separated from the silica gel by filtering through a medium grade filter paper under reduced pressure to provide a wet lysine-coated granular clay. The recovered wet lysine-coated granular clay was dried in a 70° C. oven overnight. Lysine-coated granular clay was packed in a column (1.5 cm diameter, 30 cm height, 13 cm bed height) and used for AV reduction with RB soy oil (ADM, Decatur West refinery, Decatur, Ill., USA) containing 200 ppm TBHQ. The column and feed oil was maintained at 70° C. Feed oil was kept in a closed container blanketed with nitrogen. Oil flow was kept constant at 41 g/hr and the anisidine value was determined substantially as described in example 1. The results are shown in Table 14.

TABLE 14

|  | AV | | | PV | | |
|---|---|---|---|---|---|---|
|  | Before | After | Reduction (%) | Before | After | Reduction (%) |
| Day 1 | 1.56 | 0.52 | 67 | 1.60 | 1.22 | 24 |
| Day 2 | 1.70 | 0.70 | 59 | 1.60 | 1.20 | 25 |
| Day 3 | 1.62 | 1.03 | 36 | 2.00 | 1.84 | 8 |
| Day 4 | 1.66 | 1.17 | 30 | 2.00 | 1.94 | 3 |

Lysine-coated granular clay was effective at reducing the AV of RB soy oil as compared to untreated oil as indicated in Table 14. In addition, was effective at reducing the peroxide value of RB soy oil.

EXAMPLE 20

In an additional embodiment, free base lysine was purchased from Sigma Chemical and coated onto silica gel. To coat lysine onto silica, lysine was dissolved in deionized water at 50° C. before adding silica gel (Davisil grade 636 from Aldrich Chemical). The silica gel and lysine solution were mixed for 15 minutes before the liquid was separated from the silica gel by filtering through a medium grade filter paper under reduced pressure. The recovered wet lysine-coated silica gel was dried in a 70° C. oven overnight to provide dried lysine-coated silica gel. Dried lysine-coated silica gel (12 grams, 13 cm bed height) was packed in a column and used for AV reduction of RB soy oil (ADM, Decatur West refinery, Decatur, Ill., USA). The column and feed oil were maintained at 70° C. Feed oil contained 200 ppm TBHQ and was kept in a closed container blanketed with nitrogen. Oil flow was kept constant at 41 g/hr and the anisidine value was determined substantially as described in example 1.

TABLE 15

|  | AV | | |
|---|---|---|---|
|  | Before | After | Reduction (%) |
| Day 1 | 2.23 | 1.56 | 30 |
| Day 2 | 1.85 | 0.58 | 69 |
| Day 6 | 1.42 | 0.46 | 68 |
| Day 7 | 1.7 | 0.56 | 67 |
| Day 8 | 1.53 | 0.53 | 65 |
| Day 9 | 1.42 | 0.64 | 55 |

Lysine-coated silica was very effective at reducing the AV of RB soy oil as compared to untreated oil, and remained effective for at least nine days as indicated in Table 15.

EXAMPLE 21

In an embodiment, feed-grade liquid purified fermentation broth, (ADM Liquid L-Lysine 50%) was obtained from ADM Bioproducts, Decatur Ill., USA). Liquid L-lysine (28 g) was diluted with water to a total volume of 140 ml. Davisil silica gel (200 g) was coated with the 140 ml of lysine-water solution by using a fluid bed spray dryer (Aeromatic AG, Bubendorf, Switzerland). The liquid was sprayed at 40° C., and drying was done at 70° C. The resulting adsorbent (lysine-coated silica, broth-immobilized support, 15 g) was packed into a column (1.5 cm×15 cm). RB soy oil (ADM, Decatur West Refinery, Decatur, Ill., USA) with 200 ppm TBHQ added was passed through the column as described in Example 20 except the flow rate was 41 g/hr over five days and the anisidine value was determined substantially as described in example 1.

TABLE 16

| | AV | | |
|---|---|---|---|
| | Before | After | Reduction (%) |
| Day 1 | 1.46 | 0.23 | 84 |
| Day 2 | 1.85 | 0.47 | 69 |
| Day 3 | 1.42 | 0.37 | 74 |
| Day 4 | 1.7 | 0.49 | 68 |
| Day 5 | 1.53 | 0.21 | 92 |

The feed grade liquid lysine coated on silica gel (broth-immobilized support) was very effective at reducing the AV of RB soy oil as indicated in Table 16.

EXAMPLE 22

In yet another embodiment, a column of dried lysine-coated silica gel was prepared as described in Example 20. The column was held at 70° C. and diacylglycerol (Enova oil, ADM/Kao, Decatur, Ill., USA) was passed through this column at 38 g/hour and the anisidine value was determined substantially as described in example 1.

TABLE 17

| | AV | | | PV | | |
|---|---|---|---|---|---|---|
| | Before | After | Reduction (%) | Before | After | Reduction (%) |
| Day 1 | 5.04 | 0.56 | 89 | 6.0 | 3.2 | 47 |
| Day 2 | 6.33 | 0.77 | 88 | 6.4 | 4.4 | 31 |

The anisidine value of diacylglycerol oil was reduced by greater than 85% by treatment with the active substance as indicated in Table 17. Greater than 30% reduction in peroxide value was also obtained.

EXAMPLE 23

In another embodiment, two forms of cottonseed oil (prime bleachable summer yellow (PBSY) and refined and bleached (RB)) were tested in several combinations of AV reduction, bleaching and deodorizing. For AV reduction, immobilized lysine (lysine-coated silica gel, lysine-coated adsorbent, 20% lysine on silica) was prepared substantially as described in Example 20. Each cottonseed oil was treated by passing through a 70° C. column packed with 14.1 grams of immobilized lysine substantially as described in Example 20 except the flow rate was 45 grams/hour, and the anisidine value was determined substantially as described in example 1. Treated cottonseed oil was bleached by taking up oil in a vessel. The oil was heated while being agitated with a paddle stirrer at 400-500 rpm. After the oil had reached 70° C., 2.5% (by weight) activated bleaching clay (OilDri Perform 5000) was added and agitation was continued for at 70° C. for 5 minutes. Vacuum (max. 5 torr) was applied and the mixture was heated to 110° C. at rate of 2-5° C./min. After reaching 110° C., stirring and vacuum were continued for 20 minutes. At the end of that time, agitation was discontinued, and the heat source was removed. After allowing the activated bleaching clay to settle for 5 minutes, the oil temperature had cooled to less than 100° C. Vacuum was released and a sample of oil was vacuum filtered using Buchner funnel and Whatman #2 filter paper and the anisidine value was determined substantially as described in example 1. After bleaching, cottonseed oil was deodorized as described in Example 10 and the anisidine value was determined substantially as described in example 1.

TABLE 18

| RB Cottonseed oil | |
|---|---|
| 1 Untreated | 13.11 |
| 2 Treated with lysine* | 4.21 |
| 3 Deodorized Control | 7.19 |
| 4 Treated with lysine* and deodorized | 3.96 |
| RB Cottonseed oil (second test) | |
| 5 Untreated | 19.69 |
| 6 Treated with lysine* | 6.55 |
| 7 Deodorized control | 9.54 |
| 8 Treated with lysine* and deodorized | 5.54 |

*In this table, "lysine" indicates immobilized lysine prepared as described.

The anisidine value of RB cottonseed oil was greatly reduced as compared to the untreated oil by treating with immobilized lysine. Although deodorization reduced the anisidine value of untreated oil from 13.11 to 7.19, the anisidine value of oil treated with immobilized lysine was even lower after deodorization as indicated in Table 18.

The oxidative stability of RB cottonseed oil (second test) was measured as the Oxidative Stability Index according to AOCS method Cd 12b-92. A description of that well known method may be found for example, in "Official Methods and Recommended Practices of the AOCS", Fifth Edition, Second Printing (2004) American Oil Chemists' Society, Champaign, Ill., which is incorporated herein by reference. In this method, longer OSI times indicate oils that are more resistant to oxidation and thus more stable oils.

TABLE 19

| RB Cottonseed oil (second test) | OSI (hours) |
|---|---|
| 11 Control | 5.95 |
| 12 Treated with lysine | 6.37 |
| 13 Deodorized control | 5.28 |
| 14 Treated with lysine and deodorized | 6.03 |

Treating RB cottonseed oil with lysine provided oils having longer OSI times as compared to untreated oil both before and after deodorization, as indicated in Table 19.

EXAMPLE 24

In a further embodiment, two grades of corn oil (once refined (OR), and refined, bleached (RB); ADM, Decatur West refinery, Decatur, Ill., USA) were passed through a 70° C. column packed with immobilized lysine (14.1 grams, 20% on silica, prepared as described in Example 20) at the rate of 45 grams/hour and the anisidine value was determined substantially as described in example 1. Bleaching and deodorizing of corn oil was carried out as described in example 22 except that 1.5% clay (OIL-DRI Perform 5000, Chicago, Ill.) was used in bleaching and the oil temperature in deodorization was 250° C., and the anisidine value was determined substantially as described in example 1.

TABLE 20

|   | | Anisidine Value |
|---|---|---|
| | Once refined (OR)corn oil | |
| 1 | Control | 4.80 |
| 2 | Treated with immobilized lysine | 1.86 |
| 3 | Treated with immobilized lysine and bleached | 3.24 |
| 4 | Treated with immobilized lysine and deodorized | 1.82 |
| 5 | Treated with immobilized lysine, bleached, and deodorized | 2.42 |
| | Refined, bleached (RB) corn oil | |
| 6 | Control | 5.34 |
| 7 | Treated with immobilized lysine | 2.11 |
| 8 | Deodorized (no immobilized lysine treatment) | 2.88 |
| 9 | Treated with immobilized lysine and deodorized | 1.44 |

Treatment of OR corn oil with immobilized lysine not only reduced the AV of OR corn oil as compared to untreated oil, but the low AV was maintained through the bleaching or deodorizing, or the combination of both as indicated in Table 20. The treatment of RB corn oil produced a similar large decrease in AV, which exceeded the decrease obtained by deodorization only. The last two rows of Table 20 show that the combination of deodorization and lysine treatment was especially effective in reducing AV of RB corn oil; the AV of RB corn oil that was treated with the supported lysine column and deodorized is half that of RB corn oil that was simply deodorized.

EXAMPLE 25

In one embodiment, the anisidine value of used frying oil was reduced by passage through lysine-coated silica gel. The lysine-coated silica gel was prepared as described in example 20 and 12 g was packed in a 1.5-cm dial. column (13 cm bed height). The column was maintained at 70° C. Used canola frying oil, which had been used for frying potato cubes and having an anisidine value of 51.0 was fed to the column at 45 g/hr. A sample of treated oil was taken after overnight run and the anisidine value was determined substantially as described in example 1. The anisidine value had been reduced to 39.9 as compared to untreated oil.

EXAMPLE 26

In yet another embodiment, lysine-coated silica gel prepared as described in Example 20 was used for 29 days to treat 26,560 g of RB soy oil and the anisidine value was determined substantially as described in example 1. After 29 days the effectiveness of reducing AV had diminished and the lysine-coated silica gel was judged to be spent. Regeneration of lysine-coated silica gel was carried out by heating the spent material overnight at 600° C. overnight in a muffle furnace before coating it with lysine as described in Example 20. RB soy oil (ADM, Decatur West refinery, Decatur, Ill., USA) with 200 ppm TBHQ added was passed through the lysine-coated silica gel (70° C.) at 40 g/hour and the anisidine value was determined substantially as described in example 1. The results are shown in Table 21.

TABLE 21

| | AV | | | PV | | |
|---|---|---|---|---|---|---|
| | Before | After | Reduction (%) | Before | After | Reduction (%) |
| Day 1 | 0.91 | 0.15 | 84 | 1.8 | 0.4 | 75 |
| Day 2 | 0.90 | 0.05 | 94 | 1.8 | 0.9 | 52 |
| Day 3 | 0.83 | 0.17 | 80 | 1.2 | 0.7 | 38 |
| Day 4 | 0.90 | 0.13 | 86 | 1.6 | 1.6 | 1.3 |
| Day 5 | 0.92 | 0.41 | 55 | 1.4 | 0.7 | 50 |

Regeneration of the lysine-coated silica gel produced an active substance which was very effective at reducing anisidine value as indicated in Table 21. Peroxide value was also decreased by this treatment.

EXAMPLE 27

In a further embodiment free base lysine-coated silica gel prepared substantially as described in example 20 (14.1 g) was packed in a column as described in example 20. RB cottonseed oil (ADM, Memphis Tenn.) containing TBHQ (200 ppm) was passed through the column as described in Example 20 at 45 g/hour and the anisidine value was determined substantially as described in example 1. The results are given in Table 22.

TABLE 22

| Day | Anisidine Value |
|---|---|
| Untreated | 16.02 |
| 1 | 7.54 |
| 2 | 7.07 |
| 3 | 6.61 |
| Untreated | 15.70 |
| 4 | 6.67 |
| 5 | 7.26 |
| 6 | 8.04 |
| 7 | 8.37 |
| Untreated | 15.84 |
| 9 | 8.04 |
| 11 | 9.08 |
| Untreated | 15.92 |
| 13 | 9.34 |
| 15 | 9.72 |
| 17 | 10.46 |
| 18 | 11.84 |
| 19 | 12.01 |

The AV was initially reduced by 59% as compared to untreated oil; the half-life of the lysine-coated silica gel was defined as the amount of oil required to reach a level of AV reduction that was half the initial reduction as indicated in Table 22. Thus, the anisidine value at the half-life was calculated to be:

Initial reduced AV+half the difference between the initial AV and the initial reduced AV, or:

$$6.61+0.5(16.02-6.61)=11.32.$$

Thus, the effective dosage of immobilized lysine (=grams immobilized lysine/gram of treated oil) was 0.076%. In other words, at the first half-life (19 days), the 14.1 grams of lysine-coated silica gel column had provided anisidine value reduction for 20188 grams of RB cottonseed oil, or 1433 grams of oil per gram of lysine-coated silica gel.

RB oil and treated oil were sampled on day 4 and day 18, deodorized, and the OSI values were determined at 97.8° C. according to AOCS method Cd 12b-92. The results are given in Table 23.

TABLE 23

| Treatment (days) | Untreated oil OSI (hours) | Treated oil OSI (hours) |
|---|---|---|
| 4 | 11.28 | 13.09 |
| 18 | 11.63 | 12.32 |

Treatment of oil to reduce AV was accompanied by an increase in oxidative stability as compared to untreated oil as indicated in Table 23.

EXAMPLE 28

In an embodiment, liquid lysine (Feed grade liquid lysine; ADM Liquid L-Lysine 50%, ADM Bioproducts, Decatur, Ill., USA) was used to reduce the AV of RBD soy oil in three treatments, A, B and C. Treatment A: RBD soy oil (50 ml) was mixed with liquid lysine (10 ml) in a 100-ml Erlenmeyer flask and stirred vigorously with a magnetic stirrer for 30 min at room temperature. Treatment B: RBD soy oil (200 ml) and liquid lysine (40 ml) were brought to 70° C. and mixed with an overhead stirrer at 350 rpm in a 1000-ml round bottom flask for 30 minutes. Treatment C: RBD soy oil (200 ml) and liquid lysine (40 ml) were brought to 70° C. in a 600 ml beaker and mixed for 1 min at 6000 rpm with a high shear mixer (PowerGen 700, Fisher Scientific, Pittsburgh, Pa.). After the treatments, the oil phases were separated, filtered through fast filter paper, and the anisidine value was determined substantially as described in example 1.

TABLE 24

| Treatment | AV |
|---|---|
| Untreated | 1.72 |
| A | 1.56 |
| B | 1.81 |
| C | 0.54 |

The anisidine value of oil could be reduce by simply contacting the oil with a solution of liquid lysine, and was reduced significantly (69%) by treatment C as compared to untreated oil as indicated in Table 24.

EXAMPLE 29

In another embodiment, room temperature RB cottonseed oil (250 g) from ADM/Memphis having an AV of 18.7 was placed in a 500-ml round bottom flask stirred by magnetic stirrer. Anhydrous dimethylamine gas (56.6 g, Aldrich Chemical) was bubbled into the oil through a gas dispersion tube over 90 minutes. Gas flow was controlled by a pressure regulator attached to the dimethylamine cylinder and the reaction flask was closed except a vent for the excess gas. Oil samples (10 ml) for PAV measurement were taken after 30, 60, and 90 minutes and the anisidine value was determined substantially as described in example 1. The oil temperature remained between 24 and 26° C. during the reaction. Before measuring PAV, the oil samples were put under vacuum to remove remaining gas from the oil sample.

TABLE 25

| Time (min) | AV |
|---|---|
| 0 | 18.7 |
| 30 | 13.1 |
| 60 | 14.6 |
| 90 | 15.5 |

The AV of the oil was reduced from 18.7 to 13.1 by 30 minutes of treatment with gaseous dimethylamine as indicated in Table 25. Further treatment caused an increase in the AV.

EXAMPLE 30

In a further embodiment, untreated and treated diacylglycerol oils (Enova, ADM/Kao, Decatur, Ill.) containing antioxidants were tested in three salad dressing formulations: creamy Italian dressing, separating Italian dressing, and full-fat Ranch dressing. The full-fat Ranch dressing was also suitable for use as a dip. Untreated diacylglycerol oil having an anisidine value of 5.5 was treated by passing oil through a column of lysine-coated silica gel at 70° C. at 70 grams/hour to produce a treated diacylglycerol oil having an anisidine value of 0.6. A soybean oil control was also tested in the salad dressing formulations. To the diacylglycerol oils was added mixed tocopherols (Decanox MTS 90, Archer Daniels Midland Company, Decatur, Ill.) at 500 ppm, green tea extract (90% polyphenols minimum, ATZ Natural, North Bergen, N.J.) at 100 ppm, and 99% ascorbic acid (Sigma Aldrich, St. Louis, Mo.) at 400 ppm. The antioxidants were added sequentially with stirring, and the oil was heated gently to 60° C. and stirred for 20 minutes to ensure dissolution and dispersion of antioxidants. During heating, samples were stirred in covered containers to minimize exposure of the oils to oxygen. To remove any residual green tea extract or ascorbic acid which did not solubilize into the oil, the oils were then filtered through a 60 micron nylon disc filter (NY 60, Millipore Corp, Bedford, Mass.) using a Buchner funnel equipped with vacuum filtration. Oils were transferred to 3 gallon buckets and the headspace was purged with nitrogen. Oils were allowed to cool to room temperature before formulating into salad dressings.

Salad dressings were made with the following ingredients:

TABLE 26

| Ingredient (%) | Creamy Italian | Separating Italian | Ranch |
|---|---|---|---|
| Oil | 50.000 | 42.000 | 40.000 |
| Water | 29.971 | 36.569 | 37.656 |
| Vinegar (100 grain) | 12.500 | 13.500 | 5.750 |
| Salt | 1.200 | 1.250 | 1.700 |
| Xanthan Gum | 0.150 | 0.120 | 0.250 |
| Basil | 0.050 | 0.050 | 0.100 |
| Potassium Sorbate | 0.050 | 0.050 | 0.050 |
| EDTA (50% w/v) | 0.014 | 0.014 | 0.014 |
| High Fructose Corn Syrup (ADM 42) | 3.000 | 5.500 | |
| Sodium Benzoate | 0.050 | 0.050 | |
| Celery Flakes | 0.025 | 0.025 | |
| Paprika | 0.010 | 0.020 | |
| Garlic Powder | 0.500 | | 0.450 |
| Onion Powder | 0.330 | | 0.650 |
| Egg Yolks | 1.800 | | 5.300 |
| Propylene Glycol Alginate (LVF, ISP Alginates) | 0.100 | | |
| Oregano Powder | 0.050 | | |
| Ground Black Pepper | | 0.040 | 0.050 |

TABLE 26-continued

| Ingredient (%) | Creamy Italian | Separating Italian | Ranch |
|---|---|---|---|
| Dried Chives | | 0.012 | 0.030 |
| Dried Minced Garlic | | | 0.300 |
| Dried Minced Onion | | | 0.250 |
| Celery Seed | | | 0.050 |
| Red Bell Pepper Flakes, Dehydrated | | | 0.060 |
| Red Pepper, Crushed | | | 0.040 |
| Parsley Flakes | | | 0.020 |
| Liquid Caramel Color (P212, Sethness Caramel) | | 0.010 | |
| Sugar | | | 3.150 |
| Buttermilk Powder (Land O'Lakes) | | | 1.500 |
| Sour Cream Powder (Kerry Ingredients) | | | 1.000 |
| Clintose CR10 Maltodextrin | | | 0.800 |
| ADM Lactic Acid (88%) | | | 0.450 |
| Modified Food Starch (UltraSperse M, National) | | | 0.450 |
| Lemon Juice, single strength | | | 0.400 |
| Monosodium Glutamate | | | 0.250 |
| Total (%) | 100 | 100 | 100 |

Creamy Italian dressing procedure: Blend xanthan gum and propylene glycol alginate (PGA) together in a small weigh dish. Add 10 grams of Oil and mix until well dispersed. Slowly add the xanthan gum/PGA slurry to water under good agitation (high shear mixing) and stir for ten minutes or until gums are completely hydrated. Add egg yolks, high fructose corn syrup and vinegar, stirring until mixed well. Slowly add remaining oil in a steady stream, increasing stirring speed to maintain mixing, and blend until a uniform coarse emulsion is formed. Combine remaining powdered ingredients and spices—add to dressing and stir until incorporated. Process dressing using a colloid mill set at an appropriate speed and gap. Blend in remaining particulate spices (celery flakes, basil and Italian seasoning). Package.

Separating Italian dressing procedure: Blend xanthan gum with 10 grams of oil and mix until well dispersed. Slowly add the xanthan gum slurry to water under good agitation (high shear mixing) and stir for ten minutes or until gum is completely hydrated. Add vinegar, high fructose corn syrup and caramel color, stirring until mixed well. Dry blend the remaining dry ingredients and particulate spices and add to dressing. Mix several minutes until spices are uniformly distributed. Add remaining oil and blend gently for 1 minute. Package.

Full-fat Ranch dressing and dip procedure: Dry blend xanthan gum with sugar and buttermilk powder. Weigh water into a container large enough to contain the completed dressing. Slowly add the xanthan gum mixture to the water under good agitation (high shear mixing) and stir for ten minutes or until gum is completely hydrated, increasing mixing speed to ensure good mixing. Add modified food starch to the slurry. Stir an additional 3-5 minutes. Add egg yolks and stir until smooth. Add oil, increasing speed as needed to keep mixture moving and create a crude emulsion. Dry blend remaining powdered ingredients and add to the dressing, blending 1-2 minutes. Add vinegar, lactic acid, lemon juice and EDTA and stir well. Process dressing using a colloid mill set at the appropriate gap. Add particulate spices (basil and chives) and mix well. Package.

Salad dressings were bottled in 8 ounce PET bottles with polyethylene caps (Cole Parmer, Vernon Hills, Ill.) and stored under two conditions. Testing under ambient conditions was carried out by storing the bottled dressings at 20° C. for 12 months. At months 0, 1, 2, 3, 4, 5, 6, 9, and 12, one bottle of each dressing was evaluated by tasting.

EXAMPLE 32

In one embodiment, fermentation broth from the commercial production of lysine is incubated with oil having an AV as determined substantially as described in example 1. After incubation, the AV is reduced by greater than 10% as compared to untreated oil.

EXAMPLE 33

In one embodiment, crude cottonseed oil is subjected to degumming by the addition of 0.1% phosphoric acid, followed by the addition of 2.5% water added as a wash liquid and the AV as determined substantially as described in example 1. The same crude cottonseed oil is subjected to substantially the same procedure, except that 2.5% of liquid lysine (Feed grade liquid lysine; ADM Liquid L-Lysine 50%, ADM Bioproducts, Decatur, Ill., USA) is added as a wash liquid and the AV is determined substantially as described in example 1. The AV of crude cottonseed oil washed with liquid lysine is reduced as compared to the AV of crude cottonseed oil washed with water.

EXAMPLE 34

In yet an additional embodiment, the oil to be treated, treated oil or food product including the treated oil may be produced at a first geographic location and transported or shipped to a second geographic location. For instance, a facility at the first geographic location may be able to produce a product more economically than a facility at the second location due to various factors. The factors may include, inter alia, lower costs of materials (i.e., oilseeds themselves, pesticides used for oilseed production, fertilizers), lower costs of energy (i.e., electricity or gas), lower costs of labor (i.e., wages paid to employees), lower costs of environmental controls or effects (i.e., a drought may be present in one location or certain pesticides may be highly regulated in one location), or any other requirement for production. Further, a certain product may be well suited for production in the first geographic location and desired, but not produced well in the second geographic location. As a non-limiting example, residents of Alaska may desire bananas produced in Central America. Thus, the costs of producing the products in the first geographic location may be less than the costs of producing the products in the second geographic location resulting in the production costs of the product being less in the first geographic location.

In such an instance, the oil to be treated, treated oil, or food product including the treated oil may be produced at the first geographic location and shipped to the second geographic location such as by transport over water with ships or barges, trucking, flying, or other means of transportation. The geographic location may be a county, a state, a country, a continent and/or combinations of any thereof. In this manner, the product may be produced in a first country, and transported and/or sold in a second country.

The exemplary embodiments described herein are not intended to limit the invention or the scope of the appended claims. Various combinations and modifications of the embodiments described herein may be made without departing from the scope of the present disclosure and all modifications are meant to be included within the scope of the present disclosure. For instance, the various embodiments of the oil processing described herein may be used in conjunction with other embodiments of the oil processing activities described herein. Further, the oil processing activities described herein may be implemented by retrofitting existing oil processing systems and used in conjunction with existing oil processing equipment. Thus, while certain exemplary embodiments and details have been described for purposes of exemplifying the invention, it will be apparent to those of ordinary skill in the art that various changes to the invention described herein may be made in any combination without departing from the scope of the present disclosure, which is defined in the appended claims.

What is claimed is:

1. A process for treating a lipid, comprising placing the lipid in contact with a lysine-coated silica gel, such that the anisidine value of the lipid is reduced.

2. The process of claim 1, further comprising regenerating the lysine-coated silica gel for a second use for reducing the anisidine value of a lipid.

3. A process for decreasing the content of oxidation products in a lipid, comprising;
    mixing a solution comprising at least one amino acid with a support material to obtain an active substance;
    placing a lipid having a first anisidine value in contact with the active substance to provide treated oil having a lower anisidine value as compared to the lipid not contacted with the active substance, and;
    further comprising at least one of refining, bleaching, deodorizing, winterizing, interesterifying, transesterifying, hydrolyzing, and hydrogenating the lipid.

4. A process for reducing an anisidine value of a lipid, comprising
    obtaining a lysine-coated solid support;
    reducing a water content of the lysine-coated solid support to obtain a dried lysine-coated support; and,
    contacting a lipid with the dried lysine-coated support to reduce the anisidine value of the lipid as compared to a lipid not contacted with the lysine-coated support.

5. The process of claim 4, further comprising:
    producing the lysine by fermentation;
    purifying the lysine from a fermentation broth; and
    immobilizing the lysine on the solid support.

* * * * *